United States Patent [19]
McKie

[11] Patent Number: 5,146,395
[45] Date of Patent: Sep. 8, 1992

[54] POWER SUPPLY INCLUDING TWO TANK CIRCUITS

[76] Inventor: Richard L. McKie, 4618 3rd Ave., N.W., Seattle, Wash. 98107

[21] Appl. No.: 742,761

[22] Filed: Aug. 9, 1991

[51] Int. Cl.⁵ ............................................. H02M 3/07
[52] U.S. Cl. ...................................... 363/13; 320/1; 363/16
[58] Field of Search .................... 320/1; 363/1, 13, 16, 363/27, 28

[56] References Cited

U.S. PATENT DOCUMENTS

| | | |
|---|---|---|
| 3,387,201 | 6/1968 | Greenberg et al. |
| 3,886,429 | 5/1975 | Maillard et al. |
| 4,319,315 | 3/1982 | Keeney, Jr. et al. ................. 363/22 |
| 4,488,214 | 12/1984 | Chambers ............................ 363/71 |
| 4,513,226 | 4/1985 | Josephson ........................... 363/37 |
| 4,542,440 | 9/1985 | Chetty et al. ....................... 363/26 |
| 4,628,284 | 12/1986 | Bruning .............................. 363/22 |
| 4,709,323 | 11/1987 | Lien ................................... 363/97 |
| 4,748,311 | 5/1988 | Thomas et al. ..................... 363/24 |

Primary Examiner—William H. Beha, Jr.
Attorney, Agent, or Firm—Mason, Fenwick & Lawrence

[57] ABSTRACT

The present invention provides a power supply for supplying electrical power to a load. The power supply includes first and second tank circuits having a common resonant frequency, and functions repetitively in two "major periods." In the first major period, the first tank is disconnected from powering the load and the second tank supplies power to the load while charging the first tank. In the second major period, the second tank is disconnected from powering the load, and the first tank supplies power to the load while charging the second tank. The tank circuits are arranged with constant current controllers and switches to function so that the major periods each include first and second minor "intervals." The first minor interval of the first major period defines a time during which the second tank's capacitor is providing power to the load and is charging the first tank circuit; the second minor interval of the first major period defines a time during which the second tank's inductor is charging the first tank circuit and providing power to the load. During the second major period's two minor intervals, the tank circuits perform functions identical to those performed in the first two minor intervals.

15 Claims, 10 Drawing Sheets

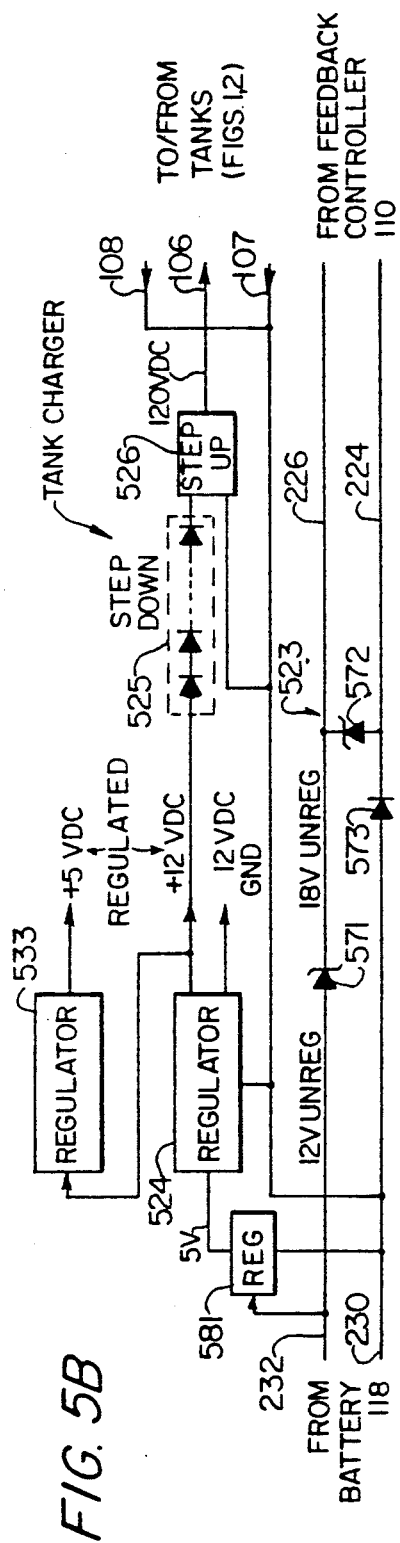
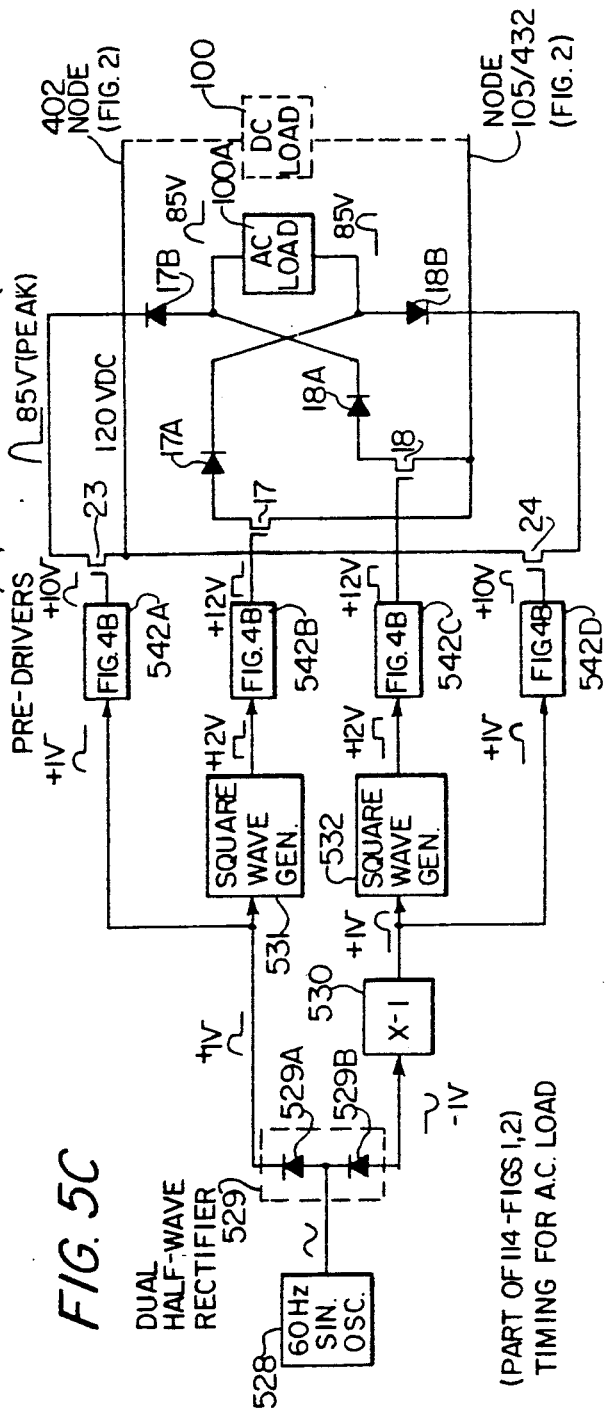
FIG. 5B
FIG. 5C

POWER SUPPLY INCLUDING TWO TANK CIRCUITS

BACKGROUND OF THE INVENTION

1. Field of the Invention

The present invention relates to power supplies for supplying electrical power to a load. More specifically, the invention relates to a high-efficiency power supply including plural tank circuits whose function and interaction are controlled by a set of specially controlled switches and constant current controllers.

2. Related Art

Power supplies including charge storage elements (or, more broadly, energy storage elements), are known in the art.

For example, U.S. Pat. No. 4,628,284 (Bruning) discloses a high-frequency, high-voltage supply involving switching of transistors for, for example, magnetrons of microwave ovens. A "dead time" is provided between the intervals when one or the other of the transistors is off.

U.S. Pat. No. 4,319,315 (Keeney, Jr. et al) discloses a DC-to-DC convertor with oppositely conducting transistor pairs.

U.S. Pat. No. 3,886,429 (Maillard et al) discloses a symmetrical power pack for adapting to different sources. The power pack provides for alternate blocking and saturation of pairs of switching transistors.

U.S. Pat. No. 4,748,311 (Thomas et al) discloses a chopper circuit having a push-pull frequency $f_O$ and parallel tuned circuit at $2 x f_O$. A goal of the Thomas et al circuit is to reduce power loss in their switching means.

U.S. Pat. No. 4,542,440 (Chetty et al) discloses a current sensor involving two power switches and two associated snubber circuits which operate 180° with respect to each other.

U.S. Pat. No. 5,513,226 (Josephson) discloses a ballast inverter circuit which comprises two tank circuits. The two tank circuits operate at a common resonant frequency. A pair of transistors are switched in opposition so as to operate in a push-pull manner.

U.S. Pat. No. 4,709,323 (Lien) discloses a parallel resonant converter in which resonant circuitry recovers energy which would otherwise be lost in the circuit's switching operation.

Efficiency of power supplies has been measured in terms of the amount of energy which is consumed internally, within the power supply itself. Of course, it is desirable to minimize the amount of energy which is consumed internally, as energy which is consumed internally cannot be delivered to the load.

There is always a need to provide power supplies having greater efficiency. The present invention fulfills this need.

SUMMARY OF THE INVENTION

The present invention is a power supply for supplying electrical power to a load. The power supply includes first and second tank circuits having a common resonant frequency, and functioning repetitively in two "major periods". In the first major period, the first tank is disconnected from powering the load and the second tank supplies power to the load while charging the first tank. In the second major period, the second tank is disconnected from powering the load, and the first tank supplies power to the load while charging the second tank.

In a particular embodiment, the inventive power supply may include a plurality of constant current controllers, which may be metal oxide semiconductor field effect transistors (MOSFETs), for connecting the tank circuits to the load. The inventive power supply may also include a set of switches for selectively interconnecting the tank circuits, constant current controllers and load.

The tank circuits, constant current controllers and switches are arranged to function in the first and second "major periods", each of which includes first and second "minor intervals". The first tank circuit comprises a first capacitor and inductor, whereas the second tank circuit comprises a second capacitor and inductor. The first minor interval of the first major period defines a time during which the second capacitor is simultaneously providing current flow through the second inductor, providing power to the load, and charging the first tank circuit; the second minor interval of the first major period defines a time during which the second inductor is simultaneously charging the first tank circuit and providing power to the load. The first minor interval of the second major period defines a time during which the first capacitor simultaneously provides current flow through the first inductor, charges the second tank, and provides power to the load; and the second minor interval of the second major period defines a time during which the first inductor charges the second tank and provides power to the load.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIGS. 5A, 5B and 5C respectively illustrate details of a preferred Gate Signal Generator, Tank Charger, and AC Load Timing Circuit, as shown schematically in FIGS. 1 and 2.

DETAILED DESCRIPTION OF THE PREFERRED EMBODIMENTS

Figure 1:
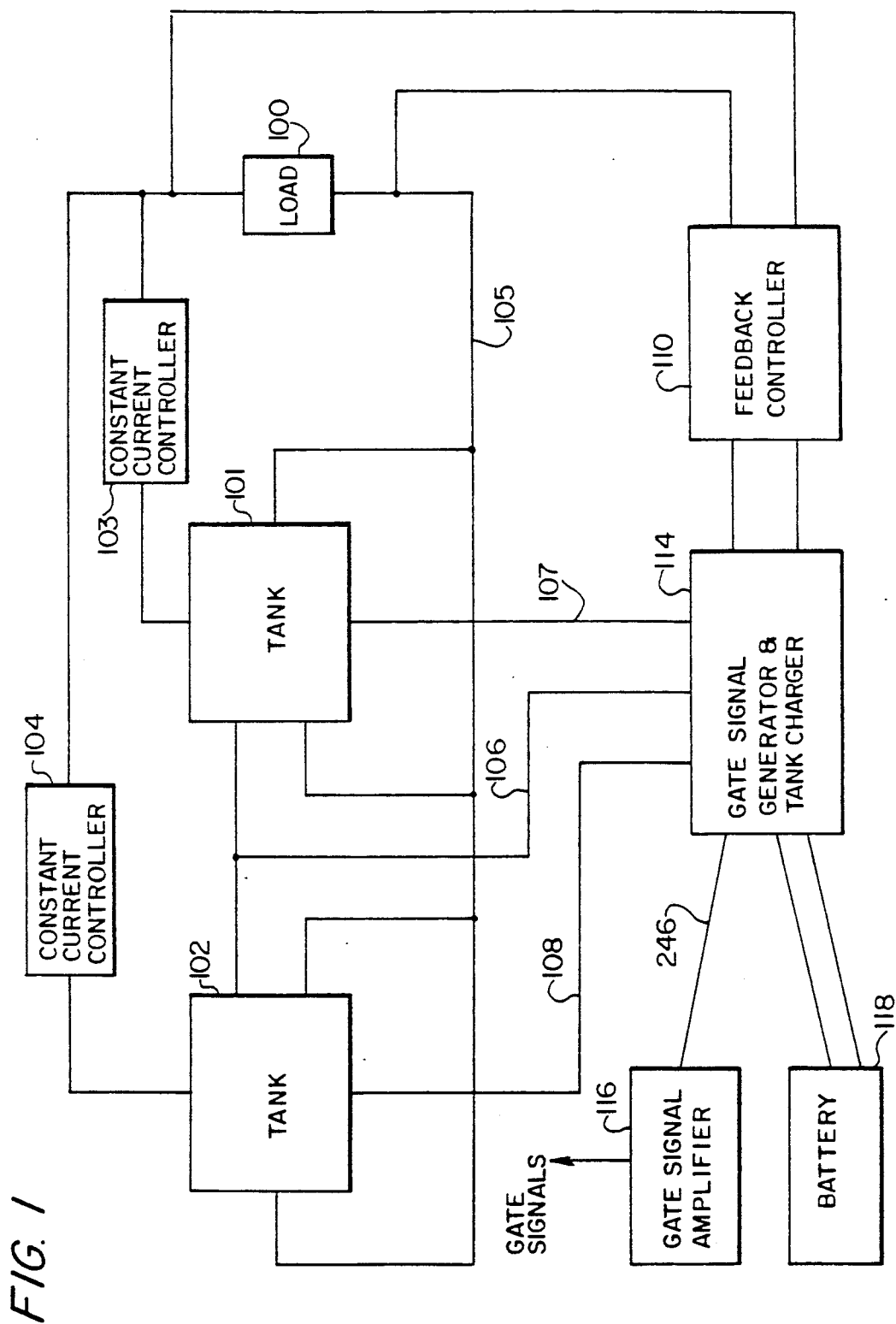
FIG. 1 is a high-level block diagram schematically indicating an embodiment of the power supply according to the present invention.

In describing preferred embodiments of the present invention illustrated in the drawings, specific terminology is employed to describe preferred elements and circuits for the sake of clarity. However, the invention is not intended to be limited to the specific terminology so selected, and it is to be understood that each specific element and circuit includes all technical equivalents which operate in a similar manner to accomplish a similar purpose. It is further understood that "gate signal generator and tank charger," "gate signal amplifier," "feedback controller," and "constant current controller," are used in the Detailed Description to include all associated circuitry, but that the scope of the invention and the interpretation of claims elements should not be so limited. Also, "node", "path", "pathway" are understood to be any suitable means to conduct electrical current from one circuit element or circuit to another and/or serve as a point where two or more such conductors are connected together. The terms "path" and "pathway" to be broadly interpreted, and may include circuit elements other than conductive nodes. According to convention, positive current flow is described; however, it is understood by those skilled in the art that positive current flow, involving flow of negatively charged electrons in the opposite direction, is but a convention to which operation of the invention is not limited.

Figure 2:
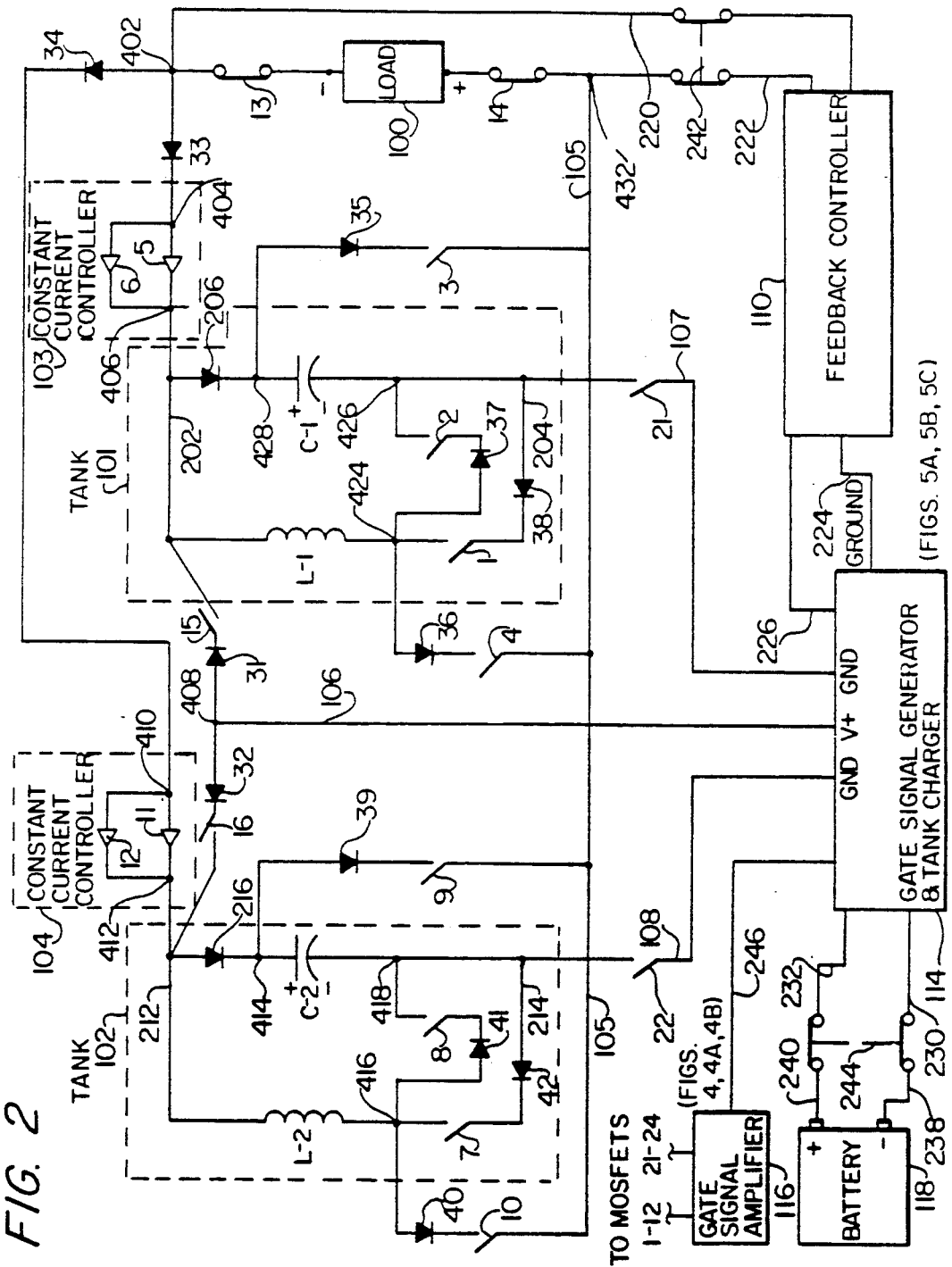
FIG. 2 illustrates in greater detail the embodiment of FIG. 1.

FIG. 1 is a high-level block diagram of a preferred embodiment of the power supply according to the present invention. The power supply is designed to provide power to a load 100. FIG. 2 illustrates the power supply embodiment in more detail.

The power supply itself includes first and second tank circuits 101, 102, respectively. The tank circuits 101, 102 are connected to a negative terminal of the load 100 via respective constant current controller circuits 103, 104 and isolating switch 13 (FIG. 2).

A common node 105 connects, via isolating switch 14 (FIG. 2), the positive terminal of the load to both tank circuits 101, 102. Tank circuits 101, 102 are connected via a common node 106 and dedicated paths 107, 108, respectively, to gate signal generator & tank charger 114. The two terminals of the load are connected via respective pathways 220 and 222 to a feedback controller 110. Feedback controller 110 is connected via respective pathways 226, 224 to gate signal generator & tank charger 114. Power is provided to the gate signal generator and tank charger 114 by either a feedback controller 110 (which may be a MOSFET gate drive circuit) or a battery 118. Gate signal generator and tank charger 114 oversees, via gate signal amplifier 116, the functioning of the constant current controller circuits 103, 104, as well as various switches which are not specifically illustrated in FIG. 1.

Various switches and constant current controller elements (which may be MOSFETs), as well as current direction controllers (preferably Schottky diodes), have been purposely omitted from FIG. 1 for the sake of clarity. Referring now to FIG. 2, the power supply of FIG. 1 is illustrated in greater detail.

First tank circuit 101 is shown to comprise a variety of elements extending between two nodes 202, 204. An inductor L1 is connected in series with a node 424, a switch 1 and a diode 38 between nodes 202, 204. Similarly, a diode 206 is connected in series with a node 428, capacitor Cl and node 426 between nodes 202, 204. A diode 37 and a switch 2 are connected in series between node 424 (between inductor L1 and switch 1) and node 426 (between capacitor Cl and node 204).

Second tank circuit 102 is structured in a manner similar to tank circuit 101. Specifically, nodes 212, 214 correspond to nodes 202, 204. Similarly, second inductor L2 and second capacitor C2 respectively correspond to first inductor L1 and first capacitor Cl. Finally, switches 7 and 8, and diodes 42, 41, and 216 respectively correspond to switches 1 and 2, and diodes 38, 37, and 206.

Diodes 206, 216 are oriented so as to allow current to flow from node 202, through respective nodes 428, 414, to respective capacitors Cl, C2. The positive terminals of capacitors Cl and C2 are connected, respectively, through nodes 428, 414, to diodes 206 and 216; the capacitors' negative terminals are connected, respectively, through nodes 426, 418 to nodes 204, 214.

The polarity of inductors L1 and L2 varies with the interval of operation of the circuit. During the first and third minor intervals (described in greater detail below), associated, respectively, with the discharging of tanks 102, 101 through their capacitors and inductors to load 100, the terminal of the inductor which is connected to node 212 (first minor interval 301) or 202 (third minor interval 303) is the positive terminal; during the second and fourth minor intervals (described in greater detail below), this polarity is reversed.

As briefly introduced in the discussion related to FIG. 1, the negative terminal of load 100 is connected through isolating switch 13 to respective tank circuits 101, 102 via respective constant current controller circuits 103, 104. FIG. 2 illustrates the connection in more detail than FIG. 1. Specifically, the negative terminal of load 100 is connected via node 402 to a diode 33 which in turn is connected to the input node 404 of constant current controller circuit 103. An output node 406 of constant current controller circuit 103 is connected to node 202 (within tank circuit 101). Diode 33 is oriented to allow current to flow from the negative terminal of load 100 through isolation switch 13 and node 402 to the constant current controller circuit 103. Constant current controller circuit 103 includes two parallel-connected constant current controller elements 5 and 6 which may be MOSFETs. Regulation of the current passing through constant current controller elements 5 and 6 is separately controlled by the gate signal generator in 114, described below.

In a manner similar to the connection of isolation switch 13, node 402, diode 33, node 404, constant current controller elements 5 and 6, node 406, and node 202, the negative terminal of load 100 is connected to the second tank circuit 102 via isolation switch 13, node 402, a diode 34, node 410, two parallel-connected constant current controller elements 11, 12 which may be MOSFETs, node 412, and node 212.

The positive terminal of load 100 is connected to two points within each of tank circuits 101, 102. Specifically, the positive terminal of load 100 is connected via isolation switch 14, nodes 105, a switch 3, and a diode 35 to node 428 between diode 206 and capacitor Cl. Also, the positive terminal of load 100 is connected via a switch 14, node 105, a switch 4, and a diode 36 to node 424 between first inductor L1 and switch 1.

In an analogous manner, the positive terminal of load 100 is connected via isolating switch 14, node 105, a switch 9, and a diode 39 to node 414 between diode 216 and capacitor C2. Finally, the positive terminal of load 100 is connected via isolating switch 14, node 105, a switch 10, and a diode 40 to node 416 between second inductor L2 and switch 7.

Node 106, which was shown schematically in FIG. 1 as commonly connected to tank circuits 101, 102, is more specifically illustrated in FIG. 2 to be connected to diodes 31 and 32. Diodes 31, 32 are connected through respective switches 15, 16 to allow current to flow from node 106 to respective nodes 202, 212 within respective tank circuits 101, 102 only when those tanks are being charged. Node 204 (within tank circuit 101) and node 214 (within tank circuit 102) are connected to respective switches 21, 22 on respective pathways 107, 108. The opposite terminals of switches 21, 22 and node 106 are presented to gate signal generator and tank charger 114. Switches 21 and 22 operate in conjunction such that they are not both simultaneously connected to their respective tank circuits 101, 102.

The negative and positive terminals of load 100 are connected via respective paths 220, 222 and switch 242, to feedback controller 110. Feedback controller 110 is connected via paths 224, 226 to the gate signal generator and tank charger 114. Path 224 is considered ground whereas path 226 is a DC voltage, typically +18 volts.

Gate signal generator and tank charger 114 receives its power from either feedback controller 110 or a battery 118 (or other equivalent power source). Typically, the positive DC voltage input 232 of the gate signal generator and tank charger 114 is connected to the positive terminal 240 of battery 118. Similarly, ground input 230 of gate signal generator and tank charger 114 is typically connected to the negative terminal 238 of battery 118. Switch 244 connects respective battery terminal 238, 240 to gate signal generator and tank charger 114 inputs 230, 232.

In operation, gate signal amplifier 116 performs the function of amplifying the gate signals generated by gate signal generator in 114 and passed to it on paths indicated as 246. Gate signal amplifier 116 distributes the amplified signals to the gates of respective switches and constant current controllers which control the function of the inventive power supply.

Switches 1-4, 7-10 and 21-22 may advantageously be implemented using metal oxide semiconductor field effect transistors (MOSFETs). As illustrated in FIG. 2, switches 3, 4, 9, 10, 21, and 22, may be implemented so that the source of the MOSFET is oriented toward the bottom of FIG. 2, and the drain of the MOSFET oriented toward the top of FIG. 2. For switches 1, 2, 7, and 8, the source of the MOSFET is oriented toward the top o right of FIG. 2 and the drain of the MOSFET is oriented toward the bottom or left. For MOSFET switches 5, 6, 11, and 12, the source is oriented toward the left and the drain is oriented toward the right of FIG. 2. The source of MOSFET 16 is oriented to the left, and the source of MOSFET 15 is oriented to the right.

The gates of the MOSFETs are the controlling elements of the switches, and are provided, via the gate signal amplifier 116, with appropriate voltage signals from gate signal generator in 114. Isolation switches 13, 14 may be advantageously implemented using mechanical, vacuum, or solid state devices suitable for connecting load 100 to, and disconnecting it from, the power supply.

Constant current controller circuits 5, 6, 11, and 12 may also be implemented as MOSFETs. However, these MOSFETs are not operated as binary switches. Rather, as indicated by the generic term "constant current controller," these MOSFETs may advantageously be operated in their linear regions, serving as current controllers. As illustrated in FIG. 2, the source of each constant current controller MOSFET may be connected, via respective nodes 406, 412, to the top node 202, 212 of the tank circuits 101, 102. The drain of each MOSFET may be connected, via respective nodes 404, 410 to the diodes 33, 34. The gate of each MOSFET is connected to the gate signal generator & tank charger 114 via gate signal amplifier 116.

Regenerative feedback controller 110 (FIGS. 1 and 2) is preferably implemented as a Vicor VI L53 Cy DC-to-DC converter, having 120 volts DC on the tank output (load) side, and a +18 volt DC output between paths 226 and 224.

Figure 3:
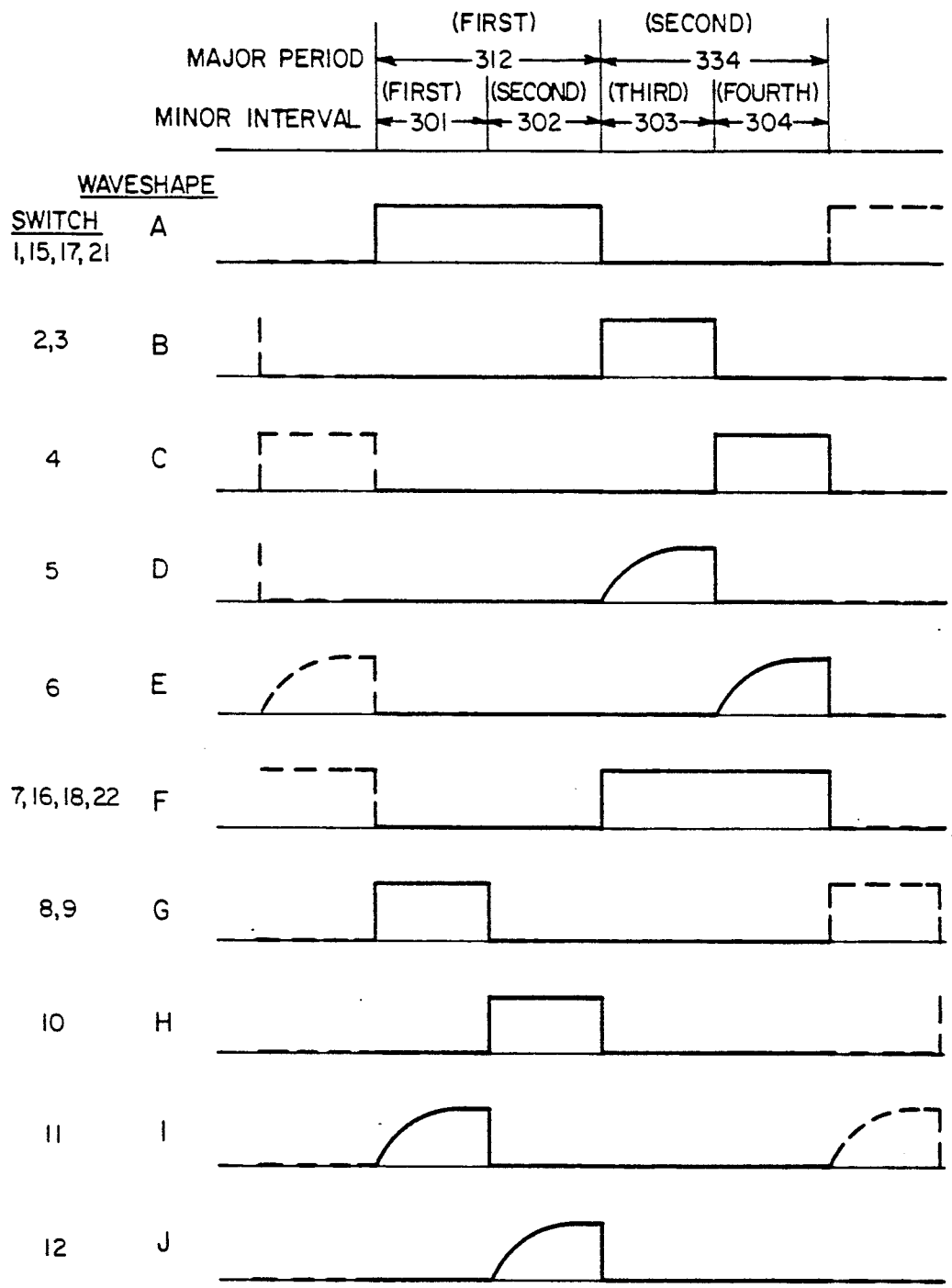
FIG. 3 is a Waveshape and Timing Diagram of certain voltage signals provided by the Gate Signal Generator to the control terminals (gates) of the switches and Constant Current Controllers of the embodiment shown in FIGS. 1 and 2

FIG. 3 is a waveshape and timing diagram illustrating signals produced by gate signal generator and tank charger 114 which controls the switches and constant current controller elements 1-12 and 21-22.

As described above, the power supply includes first and second tank circuits. The tank circuits having a common resonant frequency, and function repetitively in two "major periods" 312 and 334 (FIG. 3). In the first major period 312, the first tank 101 is disconnected from powering load 100 and the second tank 102 supplies power to load 100 while charging first tank 101. In the second major period 334, second tank 102 is disconnected from powering load 100, and first tank 101 supplies power to load 100 while charging second tank 102.

The major periods each include first and second "minor intervals." The first minor interval 301 of first major period 312 defines a time during which the second capacitor C2 is simultaneously providing power to load 100, is maintaining current flow through inductor L2, and is charging first tank circuit 101; the second minor interval 302 of the first major period 312 defines a time during which the second inductor L2 is charging first tank circuit 101 and providing power to load 100. The first minor interval 303 of the second major period 334 defines a time during which the first capacitor C1 simultaneously charges second tank 102, maintains current flow through inductor L1, and provides power to load 100; and the second minor interval 304 of the second major period 334 defines a time during which the first inductor L1 charges second tank 102 and provides power to load 100. The timing of the minor intervals and major periods is controlled by the switches in the following manner.

The first and second minor intervals of the first major period are followed immediately by the first and second minor intervals of the second major period. Consequently, they may be referred to as first, second, third, and fourth consecutive minor intervals. The first through fourth minor intervals are illustrated in FIG. 3 as elements 301, 302, 303, and 304, respectively. It is understood that the waveforms shown in FIG. 3 are repetitive, extending before and after the illustrated time segments. By convention, a high-level signal indicates that a binary switch is "on" (conducting), with a "low" level indicating the binary switch is "off" (nonconducting). The gate signal generator and tank charger 114 generates these waveforms in the illustrated synchrony.

For tank 101, waveform A is input to switches 1, 15, and 21 (FIG. 2) and 17 (FIG. 5C). Waveform B is input to switches 2 and 3. Waveform C is input to switch 4. Waveform D is input to constant current controller element 5. Waveform E is input to constant current controller element 6.

Similarly, for tank 102, waveform F is input to switches 7, 16, 22 (FIG. 2) and 18 (FIG. 5C). Waveform G is input to switches 8 and 9. Waveform H is input to switch 10. Waveform I is input to constant current controller element 11. Finally, waveform J is input to constant current controller element 12.

In the preferred embodiment, waveforms A and F are consecutively timed, positive-going square waves having a 50/50 duty cycle and a nominal frequency of 20 kHz. Waveforms B, C, G, and H are positive-going square waves having a 25/75 (25%) duty cycle at 20 kHz. Waveforms D, E, I, and J, are positive-going exponential waves having a 25/75 (25%) duty cycle at 20 kHz. The illustrated waveshapes are used with a positive voltage power supply. Not shown are the complementary negative waveshapes which could be used with a complementary negative power supply applying the same principles as the illustrated power supply.

Only one of waveforms B, C, G, and H are active in a minor interval. Waveform G is active during the first minor interval; waveform H, during the second minor interval; waveform B, during the third minor interval; and finally, waveform c is active during the fourth minor interval. Waveforms I, J, D, and E are activated during the first, second, third, and fourth minor intervals, respectively. These waveforms are carefully-controlled analog waveforms, preferably exponential in shape, which regulate the amount of current supplied by respective constant current controller elements 11, 12, 5, and 6, so as to control the current ultimately fed to the load 100 by respective tank circuits 102 and 101. The exponential waveforms may be generated in any suitable fashion, such as using analog networks or digitally implemented waveform generators in a manner known to those skilled in the art.

The flow of current in the circuit of FIG. 2 for startup operation during the first through fourth minor intervals is now described. The function of the various circuit components is the same as during steady-state operation, described more fully below.

During start-up, switches 13 and 14 are opened, isolating load 100 from the power supply. Switch 244 is closed, providing power from battery 118 (or an equivalent power supply) to the gate signal generator and tank charger !14. Switch 242 is also closed, thus connecting feedback controller 110 to the output of the tanks, which, under steady-state operation, serves load 100 as well as feedback controller 110. The gate signal generator and tank charger 114 is turned on and, simultaneously, switches 1, 8, 9, 11, 15, and 21 are turned on and switches 4, 6, 7, 16, and 22 are turned off. Thus begins the charging of tank 101 during major period 312, minor interval 301 (FIG. 3).

Tank 102 has no charge at this time, consequently, it cannot perform its steady state operation which is to provide power to load 100 and charge tank 101. The switches of tank 102 are, however, connected during startup in the same sequence as they would be during steady-state operation.

Since only tank 101 needs to be charged initially during startup, power only needs to be routed from battery 118 (or equivalent power supply) through gate signal generator and tank charger 114, tank 101, and feedback controller 110, finally returning to the gate signal generator and tank charger 114.

At the end of minor interval 301/beginning of minor interval 302, switches 8, 9, and 11 are turned off and, simultaneously, switches 10 and 12 are turned on. At the end of minor interval 302, major period 312/beginning of minor interval 303, major period 334, switches 1, 10, 12, 15, and 21 are turned off, and, simultaneously, switches 2, 3, 5, 7, 16, and 22 are turned on, during which tank 101 discharges through feedback controller 110 and gate signal generator & tank charger 114 to begin charging tank 102. Finally, at the end of minor interval 303/beginning of minor interval 304, switches 2, 3, and 5 are turned off and, simultaneously, switches 4 and 6 are turned on. At the end of major period 334, both tanks continue in their respective charge/discharge sequence, as indicated in FIG. 3.

During both major periods and all four minor intervals, gate signal generator and tank charger 114, through gate signal amplifier 116, provides the necessary voltage signals to the switches in order to allow them to control the charging and discharging of tanks 101, 102 according to the timing sequence presented in FIG. 3. At the end of major period 312, isolation switches 13 and 14 can be closed, providing power to load 100.

Operation during steady-state conditions will now be described. Special reference is made to FIGS. 2A-2D which respectively illustrate current flow during the four consecutive minor intervals.

During the first minor interval 301, capacitor C2 simultaneously maintains current flow through inductor L2, charges tank circuit 101, and provides power to the load 100. Current passes from the positive terminal of C2 through node 414, diode 39, switch 9, node 105 and switch 14 to the positive terminal of load 100. From the negative terminal of load 100, current passes through node 402, diode 34, node 410, MOSFET 11, and node 412 to re-enter tank circuit 102. Current then passes through inductor L2, node 416, diode 41, MOSFET 8, and node 418 to return to the negative terminal of capacitor C2.

Figure 2A:
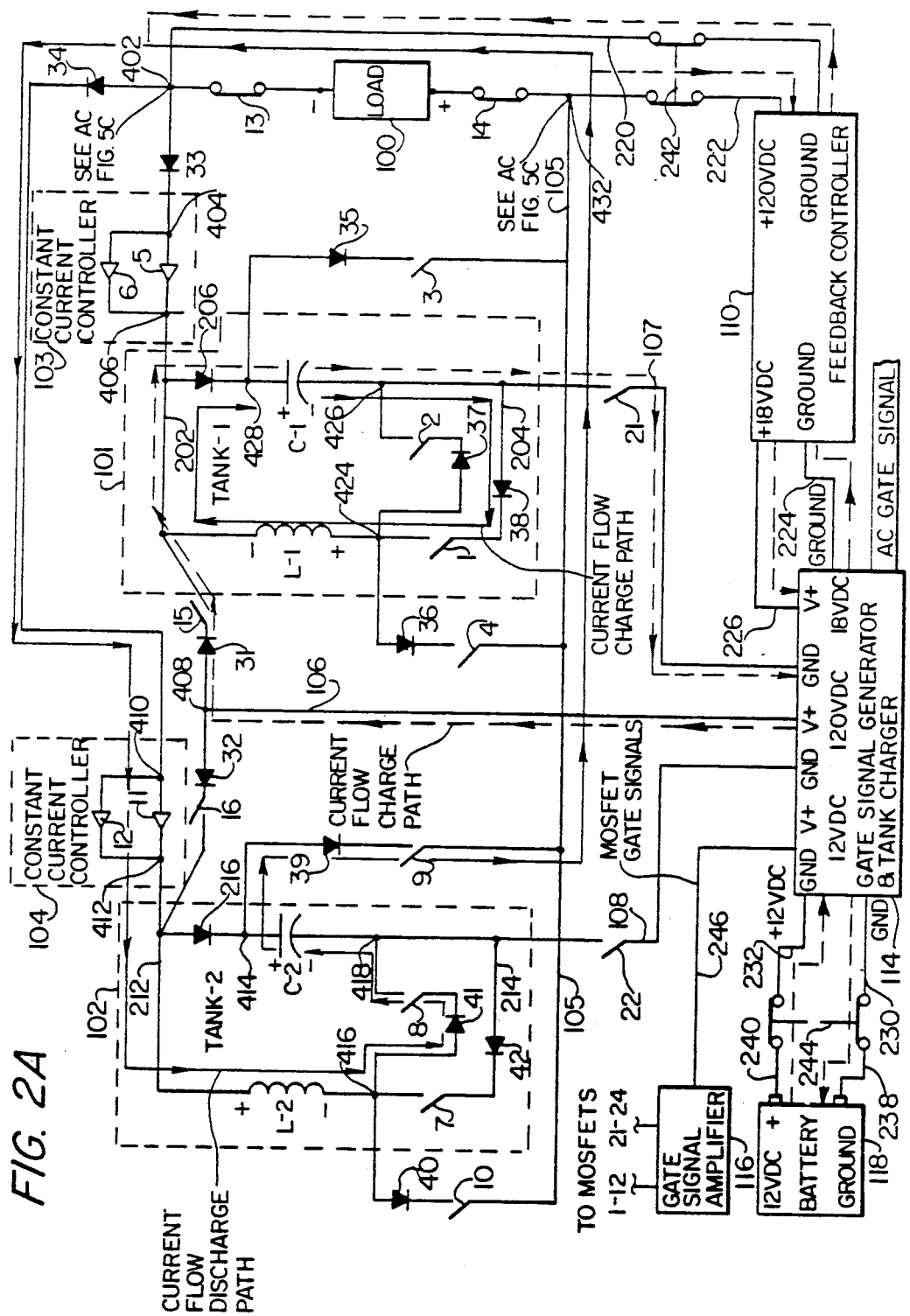
FIGS. 2A and 2B illustrate current flow during the first and second minor intervals associated with the first major period, as shown graphically in FIG. 3.
Figure 2B:
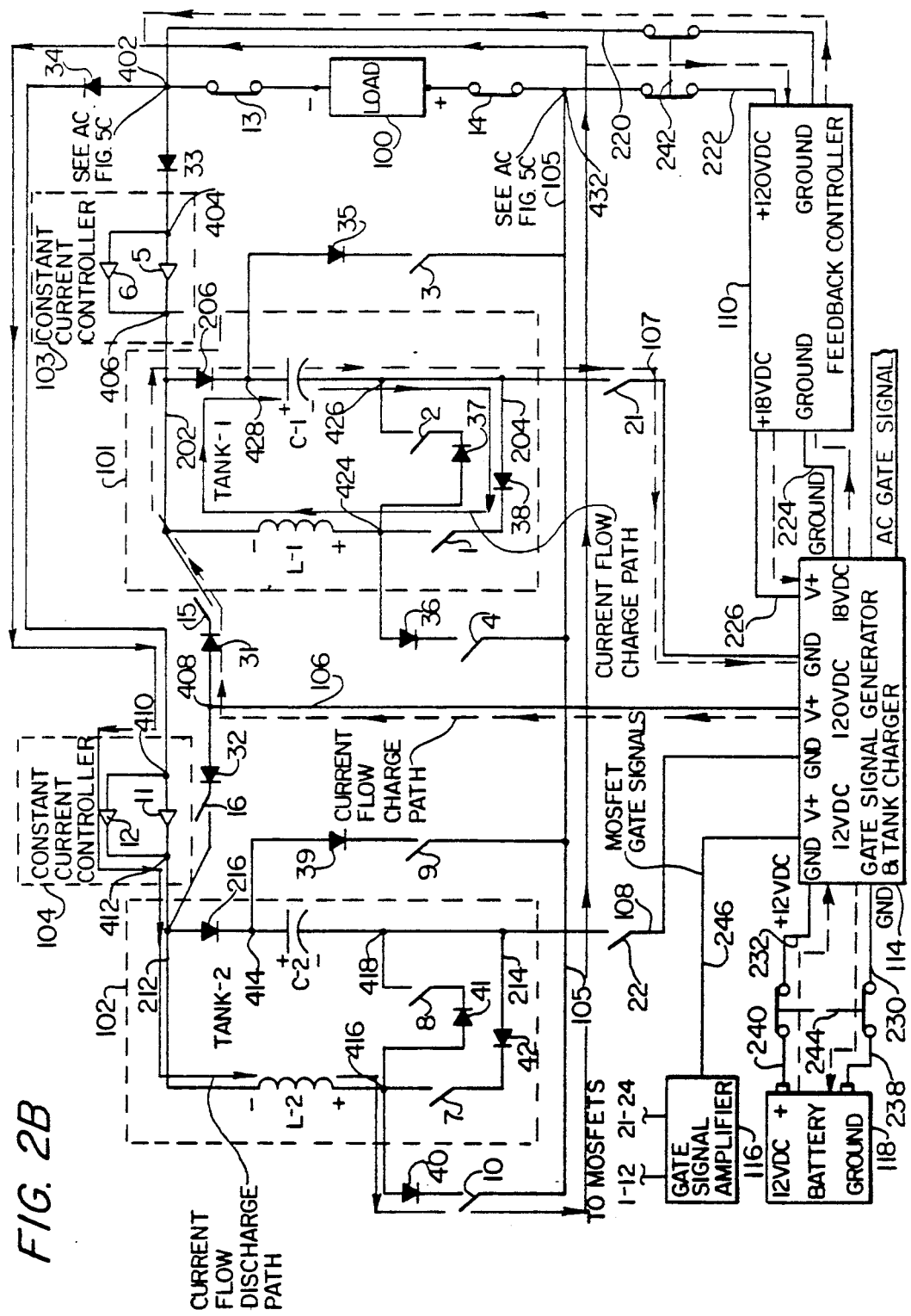

It is understood that, within tank circuit 101, an internal tank current is flowing in a clockwise direction (as viewed in FIG. 2A).

At the same time, tank circuit 101 is being charged. Current flows from gate signal generator and tank charger 114 through node 106, diode 31, switch 15, node 202, diode 206, and node 428 to capacitor Cl. Current continues to flow from the opposite (negative) terminal of C! through node 426, switch 21, along path 107 before returning to the gate signal generator & tank charger 114.

Feedback controller 110 receives some of the current from node 432 through switch 242, along path 222, with current passing along path 226 to gate signal generator & tank charger 114. Current also passes from gate signal generator & tank charger 114 along path 224, through feedback controller 110, along path 220, through switch 242, node 402 and switch 13 to the negative terminal of load 100.

In the second minor interval 302, inductor L2 provides power to load 100 while charging tank circuit 101. Specifically, current passes from conductor L2 through node 416, diode 40, switch 10, node 105 (432), and isolation switch 14 to the positive terminal of load 100. Current then passes from the negative terminal of load 100 through isolation switch 13, node 402, diode 34, node 410, constant current controller MOSFET 12, and node 412 before returning to inductor L2. The description of currents during this second minor interval 302 is otherwise identical to the description of those in the first minor interval 301.

During the third minor interval 303, a process occurs which is a repeat of that in the first minor interval 301, with tank 101 supplying power to load 100, tank 102, and associated circuitry. Capacitor Cl within the first tank circuit 101 now provides power to the load and charges the second tank circuit 102. Specifically, current flows from the positive terminal of capacitor C1 through node 428, diode 35, switch 3, node 105 (432), and isolation switch 14 to the positive terminal of load 100. Current then flows from the negative terminal of load 100 through isolation switch 13, node 402, diode 33, node 404, constant current controller MOSFET 5, nodes 406, 202, inductor L1, node 424, diode 37, switch 2, and node 426 before returning to the negative terminal of capacitor C1.

Figure 2C:
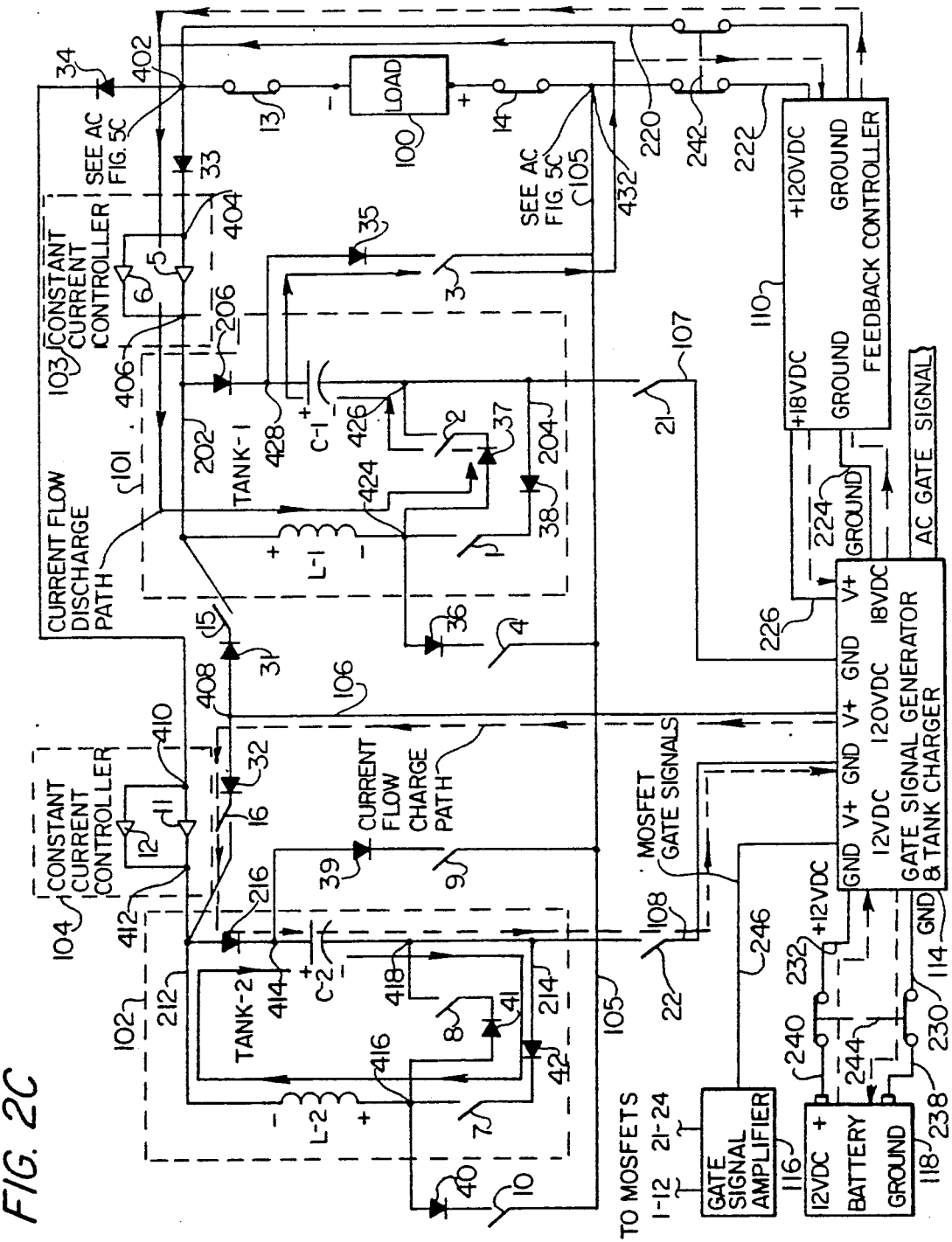
FIGS. 2C and 2D illustrate current flow during the third and fourth minor intervals associated with the second major period, as shown graphically in FIG. 3.
Figure 2D:
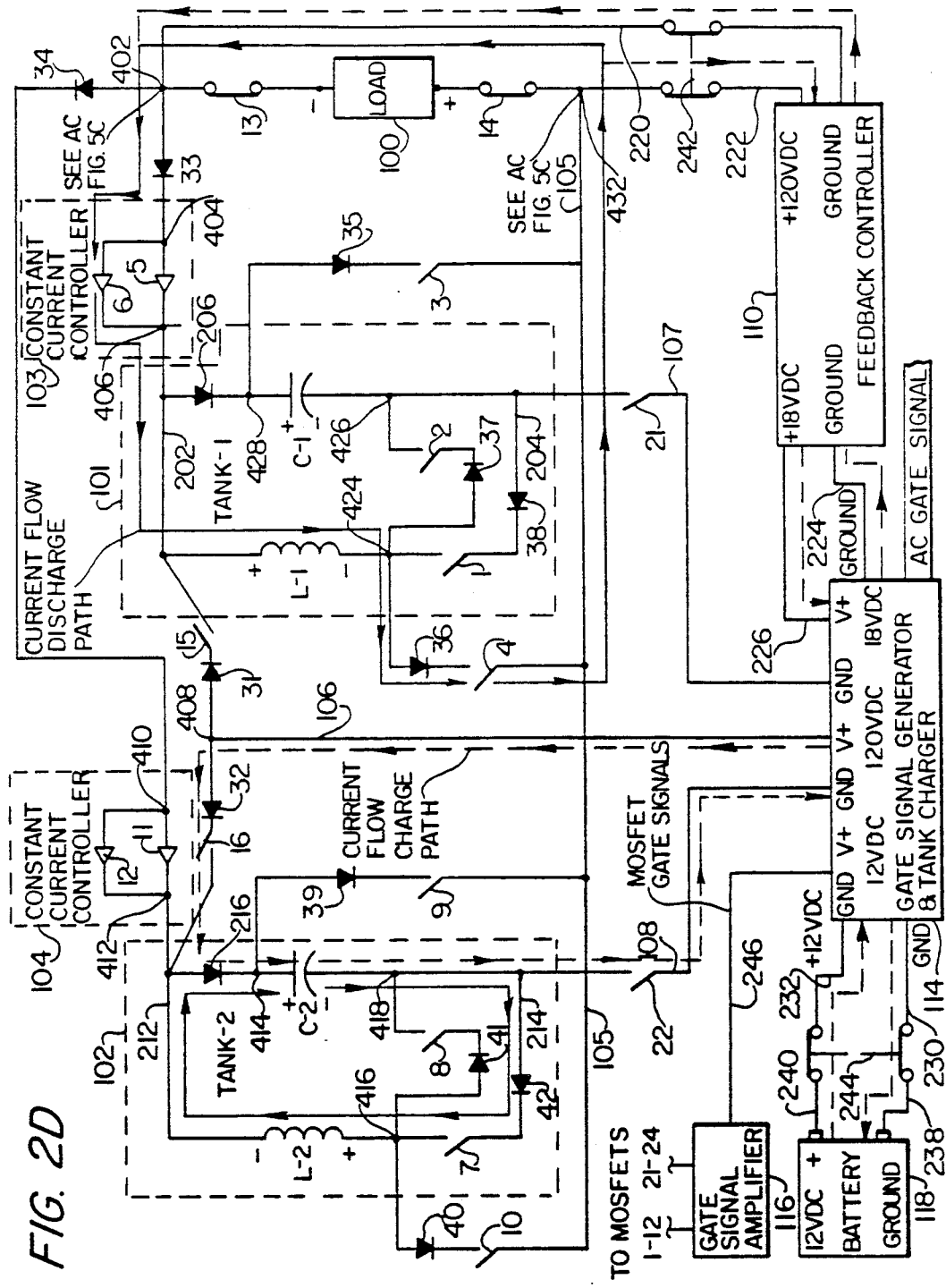

Inside tank circuit 102, an internal resonant current flows in a clockwise direction, as viewed in FIG. 2C. Current flows from gate signal generator and tank charger 114 through node 106 (408), diode 32, switch 16, node 212, diode 216, and node 414 to the positive terminal of capacitor C2. Current also flows from the negative terminal of capacitor C2 through node 418, switch 22, along path 108 before returning to gate signal generator and tank charger 114.

Current flows from node 432 and switch 242 along path 222 to feedback controller 110, and then along path 226 to the gate signal generator and tank charger 114. Current returns along path 224 through the feedback controller 110 through switch 242 along path 220 to node 402.

During the fourth minor interval 304, inductor L1 provides power to the load and charges the second tank circuit 102. Specifically, current flows from the positive terminal of inductor L1 through node 424, diode 36, switch 4, node 105 (432), and isolation switch 14 to the positive terminal of load 100. Then, current flows through isolation switch 13, node 402, diode 33, node 404, constant current controller MOSFET 6, and nodes 406, 202 to return to the negative terminal of inductor L1. Other current flow in the circuit during the fourth minor interval 304 is identical to that described above, with respect to the third minor interval 303.

Appropriate gate control signals are sent from the gate signal generator & tank charger 114, along path 246, to gate signal amplifier 116, and then on to the gates of MOSFETs 1-12, 21, 22, according to the timing and waveshape diagram FIG. 3.

Specific values which have been found advantageous for various components in FIG. 2 are provided in the following Table. However, it is to be understood that substitutions of and variations upon the following components, component values, component types, and parameter ranges may be made by those skilled in the art while still remaining within the spirit and scope of the present invention, as defined by the claims which follow this specification.

TABLE ONE

| Element | Implementation |
| --- | --- |
| Switches 1-4 | IRF350 MOSFETS (400 volt, 60 amp pulsed) |
| Switches 7-10 | IRF350 MOSFETS (400 volt, 60 amp pulsed) |
| Switches 21-22 | IRF641 MOSFETS (150 volts, 72 amps pulsed) |
| Switches 15-16 | IRF350 MOSFETS (See above) |
| Constant current controllers 5-6 | IRF350 MOSFETS (See above) |
| Constant current controllers 11-12 | IRF350 MOSFETs (See above) |
| Diodes 206, 216 | IRF60HFU(R)200 (200 volts, 60 amps-(Super Fast Recovery) |
| Diodes 31, 32 | IRF60HFU(R)200 (200 volts, 60 amps-(Super Fast Recovery) |
| Diodes 33, 34 | IRF60HFU(R)200 (200 volts, 60 amps-(Super Fast Recovery) |
| Diodes 35-38 | IRF60HFU(R)200 (200 volts, 60 amps-(Super Fast Recovery) |
| Diodes 39-42 | IRF60HFU(R)200 (200 volts, 60 amps-(Super Fast Recovery) |
| Inductors L1, L2 | MICROTRAN SL4-23-F (Toroid/21 μH @ 30 amps) |
| Capacitors C1, C2 | COMPONENTS RESEARCH 3.14 uF/600 volts/30 amps @ 200 kHz |

(IRF = International Rectifier Co.)

Figure 4A:
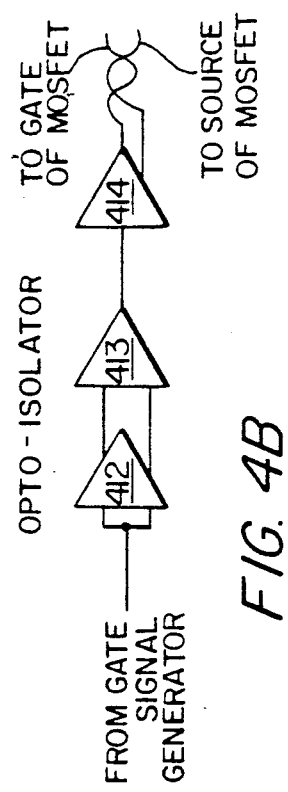
FIG. 4 illustrates a preferred Gate Signal Amplifier shown in FIGS. 1 and 2, FIGS. 4A and 4B showing details thereof.
Figure 4B:
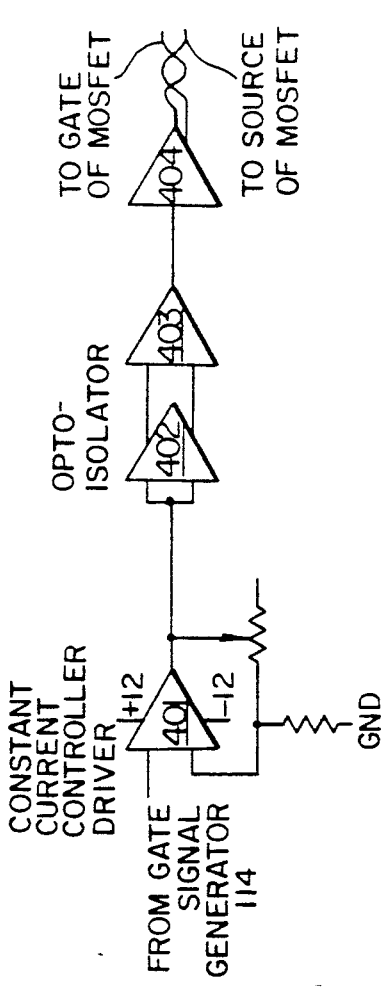
Figure 4:
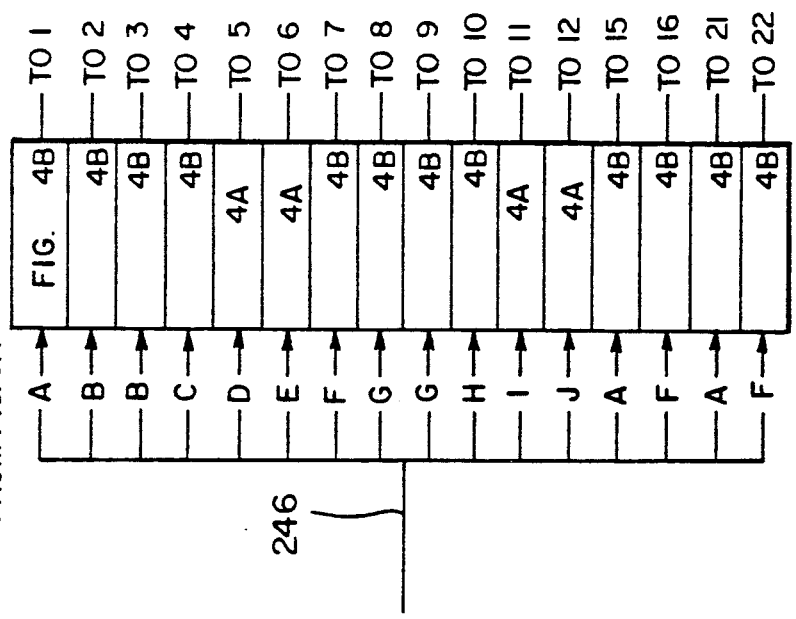

Referring now to FIGS. 4, 4A, and 4B, the gate signal amplifier 116 (FIGS. 1 and 2) is illustrated in more detail. In particular, gate signal amplifier 116 is shown to be an array of a plurality of drivers and pre-drivers. Various signals which pass along paths 246 from gate signal generator 114 to the gate signal amplifier 116 (FIGS. 1 and 2) are input to respective drivers/pre-drivers. The details of the generation of the various signals which travel along path 246 are described below, with reference to FIG. 5A.

Figure 5A:
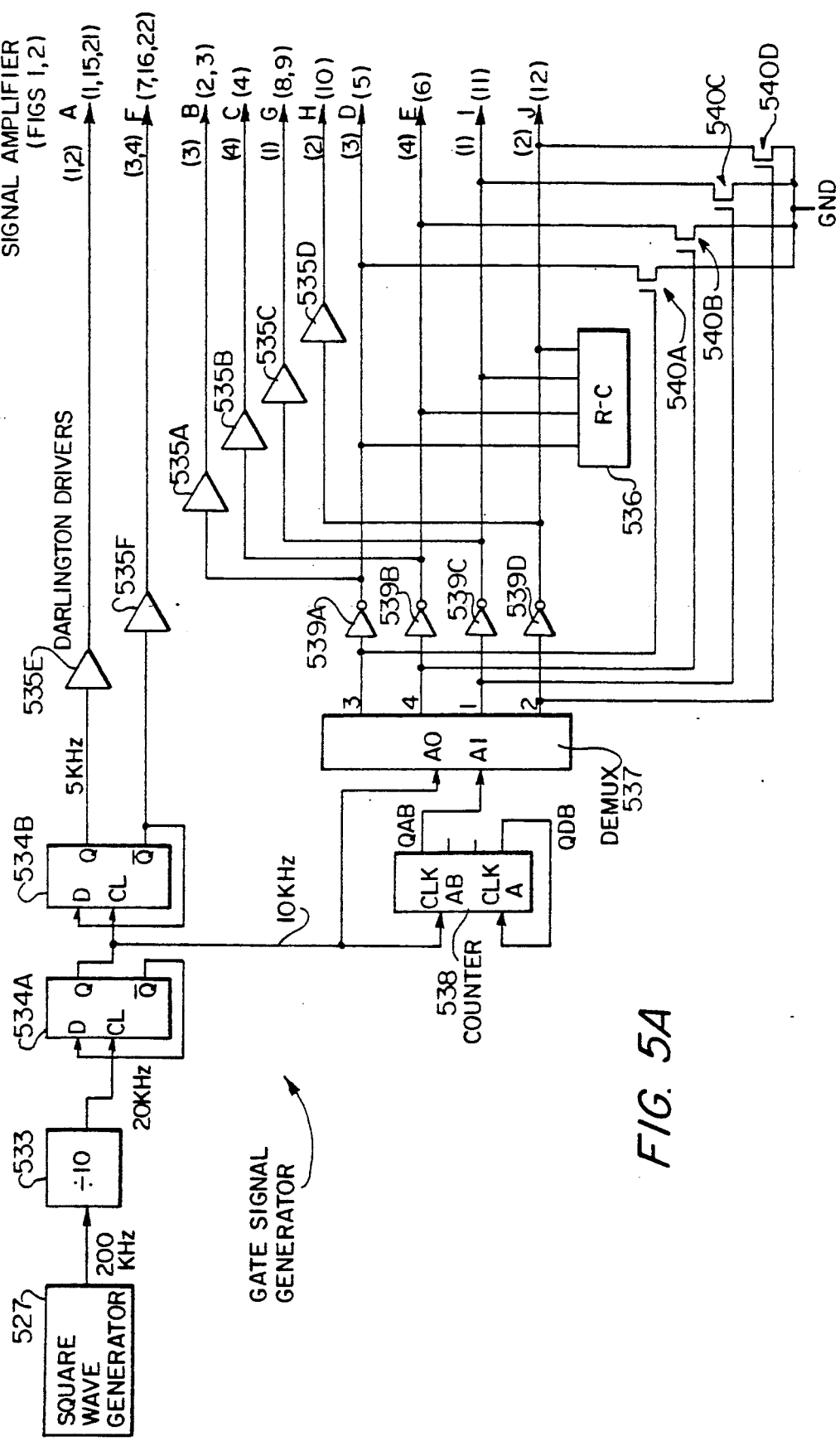

Referring to FIG. 4, the signals which pass on paths 246 to the gate signal amplifier 116 are shown diverging to respective drivers and pre-drivers. The signals entering from the left of FIG. 4 ar those signals A-J which are illustrated in FIG. 3. Each of the FIG. 3 signals generated in FIG. 5A is input to one of two circuits, the two circuits being respectively illustrated in FIGS. 4A and 4B. The circuits shown in FIGS. 4A and 4B are shown in block form in FIG. 4, for purposes of clarity. Each of the blocks shown in FIG. 4 drives a respective gate of a MOSFET switch or constant current controller shown in FIG. 2.

Signals D, E, I, and J drive constant current controllers 5, 6, 11, and 12, and are analog signals. The circuit shown in FIG. 4A is used for these analog signals. Most of the signals shown exiting to the right of FIG. 4 are binary signals, the binary signals being input to MOSFETs which function as on-off switches. The circuit shown in FIG. 4B is used for these binary signals.

Referring to FIG. 4A, four series-connected elements 401, 402, 403, 404 are illustrated. The first element 401 is a constant current controller MOSFET gate input signal driver which is preferably implemented as an International Rectifier IR2129. The gain and drive characteristics of the driver 401 are determined by fixed and adjustable resistors which are connected and adjusted in accordance with manufacturer's specifications provided in published data sheets.

Driver 401 drives the input of a MOSFET opto-isolator pre-driver comprising elements 402, 403, and 404. Element 402 is preferably a CD40107BEX, and element 403 is preferably an HCPL-2231. Elements 402, 403 effectively provide electrical isolation through use of optical isolation technology. A final MOSFET gate driver 404 is indicated, although it is optional in many embodiments.

It is understood that each of elements 401-404 are provided with regulated power (+12 volts DC and −12 volts DC from FIG. 5B).

Referring now to FIG. 4B, series-connected elements 412, 413, and 414 are illustrated. These elements correspond respectively to elements 402, 403, and 404 (FIG. 4A). Because the circuit in FIG. 4B does not drive a constant current controller MOSFET gate, no element corresponding to FIG. 4A element 401 is required. Otherwise, the function of FIG. 4B is substantially the same as that of FIG. 4A.

Referring now to FIG. 5A, the gate signal generator (part of element 114 in FIGS. 1 and 2) is illustrated. A square wave generator 527 produces a 200 kHz square wave output, nominally 1 volt in magnitude and having a 50/50 duty cycle. The square wave generator 527 may be implemented using a Texas Instruments SN74LS624N voltage controlled oscillator.

The output of square wave generator 527 is received by a frequency divider 533, a divide-by-10 element, which produces a 20 kHz square wave. The implementation of divide-by-10 element 533 is preferably a Motorola MC74HC4017 synchronous counter.

The 20 kHz square wave output by divider 533 is input to the clock input of a first D flip-flop 534A. The non-inverting output of flip-flop 534A is input to the clock input of a second D-flip-flop 534B. The inverted outputs of flip-flops 534A, 534B are fed back to their respective D inputs. In this configuration, on the rising edge of each clock input, the respective outputs are toggled to the respective opposite states, as determined by the state of the inverted output during the previous cycle of the clock input. In this manner, each of the flip-flops 534A, 534B functions as a divide-by-2 frequency divider. Thus, the output of flip-flop 534A is a 10 kHz square wave, whereas the output of flip-flop 534B is a 5 kHz square wave.

The non-inverted output of flip-flop 534A is input to the CLK AB input of a counter 538, as well as to the less significant address input bit A0 of a demultiplexer 537. The QAB output of counter 538 is input to the more significant address bit A1 of demultiplexer 537. Also, the most significant counter bit QDB of counter 538 is fed back to the CLK A input of the counter.

Flip-flops 534A, 534B may be implemented as an RCA 249CD4013AE Dual D flip-flop chip. Demultiplexer 537 may be implemented as a Motorola 832100 M74LS139T 1-of-4 Decoder/Demultiplexer chip. Finally, counter 538 may be implemented as a Motorola Dual 4-Stage Binary Ripple Counter, with a clock AB input being pin 15, the clock A input being pin 1, and the QAB and QDB outputs being pins 13 and 9, respectively.

Demultiplexer 537 has four outputs. Only one of the four outputs is active at the same time. The signals input to address inputs A0 and A1 ensure that, at a suitable frequency to synchronize with the outputs of flip-flop 534B, the demultiplexer signal which is active scans progressively from one output of the demultiplexer to the next. The labels 1, 2, 3, and 4 at the output of demultiplexer 537 indicate the minor interval (as defined with reference to FIG. 3) in which the corresponding output is active. The presence of counter 538 ensures that no "lock-up" occurs and that the scanning of the active pulse is continuous and repetitive.

The outputs of flip-flop 534B as well as the outputs of demultiplexer 537 determine the timing for all of MOSFETs 1-12, 15-16, and 21-22 (shown in FIGS. 1 and 2). These signals are labelled A-J at the right of FIG. 5A, and correspond to similarly labelled signals in FIG. 3. Also, the minor interval (1, 2, 3, or 4) during which each signal is active is also labelled, near the right of FIG. 5A.

The manner in which the outputs of flip-flop 534B and demultiplexer 537 determine these control signals is no described. The four outputs of demultiplexer 537 are input to respective logical inverters 539A, 539B, 539C, and 539D, which may be implemented as part of a Motorola MC74HC04N Hex inverter chip. Modified (exponentially shaped) outputs of inverters 539A, 539B, 539C, 539D provide signals D, E, I, J, respectively, which control the gates of constant current controller MOSFETs 5, 6, 11, 12, respectively.

It is understood from previous discussion that the signals D, E, I, and J are not binary signals, but are preferably exponential signals. To provide this exponential wave shaping, a wave shaping element 536, which may be conceptualized as essentially an R-C wave shaper, is employed. In a preferred embodiment, wave shaper 536 may be an RCA CA324E, connected to the outputs of inverters 539A-539D in a manner readily implemented by those skilled in the art using published data sheets for the CA324E.

To provide additional current boosting for the signals D, E, I, and J, the respective outputs of the demultiplexer 537 are input to the gates of four MOSFETs 540A, 540B, 540C, and 540D. The drain-source pathways of these MOSFETs are connected between respective wave shaped outputs of the inverters and ground. MOSFETs 540A, 540B, 540C, 540D are preferably implemented using Siliconix VN10KM N-Channel MOSFETs, rated at 60 volts and 1 amp (pulsed). Thus, the proper shape and power gate signals D, E, I, and J are provided via gate signal amplifier 116 (FIG. 4) to constant current controller MOSFETs 5, 6, 11, and 12.

Meanwhile, the binary MOSFET gate signals A, F, B, C, G, and H are produced by Darlington drivers 535E, 535F, 535A, 535B, 535C, and 535D, respectively. These Darlington drivers, preferably implemented as a Motorola ULN2003A Darlington Transistor Array, receive respective outputs from the non-inverted and inverted outputs of flip-flop 534B, and the respective outputs of inverters 539A, 539B, 539C, and 539D.

All the signals exiting the right of FIG. 5A are sent to the gate signal amplifier 116 offered in detail in FIGS. 4, 4A, and 4B, before controlling the timing and operation of the MOSFETs which are in the tank circuit shown in FIGS. 1 and 2.

It is understood that the circuit elements illustrated in FIG. 5A are provided with proper power in the form of regulated voltage signals. The regulated voltage signals are generated on FIG. 5B.

Referring now to FIG. 5B, voltage regulators and the tank charger considered a part of element 114 (FIGS. 1 and 2) are illustrated. The bottom of FIG. 5B illustrates the connection between battery 118 (at the left of FIG. 5B) and feedback controller 110 (at the right of FIG. 5B). The difference between the unregulated 18 volts received from feedback controller 110 (FIGS. 1 and 2) and the unregulated 12 volts from the battery 118 (FIGS. 1 and 2) is provided by a Zener diode 571, preferably a 5.1 volt Zener used as a voltage shifter. Similarly, a second Zener diode 572 is provided between the positive and ground lines 226, 224, the Zener diode 572 preferably implemented as a 12.1 voltage Zener used as a voltage regulator. Finally, a third diode allows passage of current from battery 118 on path 230 to path 224 to feedback controller 110. The third diode 573 is preferably implemented as a IN914 functioning as a reverse polarity protector.

Regenerative feedback controller 110 (FIGS. 1 and 2) is preferably implemented as a Vicor DC-to-DC converter, having 120 volts DC on the tank output (load) side, and a +18 volt DC output between paths 226 and 224. The Zener diode 572 ensures a 12 volt DC potential matches that from battery 118.

Regulated power is provided as follows. Referring again to FIG. 5B, a first regulator 524 is connected to ground and to the unregulated 12 volt input from battery 118 on path 232, through a voltage regulator 581. Voltage regulator 581 is preferably implemented as a 7805. Regulator 524, preferably implemented as a Maxim MAX743 Dual Output Switch Mode Regulator operating with two Maxim LM78L12 Linear Regulators, produces regulated +12 volt DC and −12 volt DC outputs. The +12 volt DC output is input to a second regulator 533, which is preferably implemented as a 7805 UC8621 5 volt regulator. Regulators 524 and 533 provide the regulated +12 volt DC, +5 volt DC, and −12 volt DC levels to circuits in FIG. 5A, 5C, 4A, and 4B, in a manner readily appreciated by those skilled in the art.

The tank charger portion of element 114 (FIGS. 1 and 2) may be implemented as follows. In FIG. 5B, the tank charger circuitry which controls paths 106, 107, 108 (FIGS. 1 and 2) is shown to comprise a series-connected step down element 525, and a step up element 526. Step down element 525 receives the 12 volt DC regulated power and steps it down through a series of 12 series-connected diodes and an adjustable resistor to provide an output of +5.14 volts DC. Then, step up element 526, preferably implemented as an E12-12-1.5150 ERG Inc. DC-to-DC voltage converter, produces a regulated 120 volt DC output. The output of step u element 526 provides power through node 106 (also shown in FIGS. 1 and 2) to both tank elements 101, 102. The ground lines leading to the respective tanks via switches 21 and 22 (FIG. 2) are shown as pathways 107, 108 (FIGS. 1, 2, 5B).

Referring now to FIG. 5C, circuitry which provides timing for an AC load 100A is illustrated. This circuit is in contrast to that providing power to a DC load 100 (shown in FIGS. 1 and 2). The circuit illustrated in FIG. 5C provides a 60 Hz, 120 volt RMS signal to the AC load 100A.

More specifically, a 60 Hz sinusoidal oscillator 528 produces a 1.0 volt 0-to-peak sinusoidal signal. Preferably, the sinusoidal oscillator is implemented as a Micro Linear ML2036 Programmable Sine Wave Generator, programmed to produce the above-mentioned signal applying information in published data sheets accompanying the Micro Linear product. The sinusoidal output of oscillator 528 is input to a dual half-wave rectifier 529. Half-wave rectifier 529 includes two diodes 529A, 529B. The positive portion of the sine wave is passed along a top path to both a square wave generator 531 and a first pre-driver 542A. Conversely, the negative portion of the sine wave is inverted by a unity-gain invertor before being input to a second square wave generator 532 and a fourth pre-driver 542D. Square wave generators 531, 532 are similarly constructed square wave generators which produce +12 volt square waves synchronous with their respective sinusoidal inputs. The outputs of square wave generators 531, 532 are input to second and third pre-drivers 542B, 542C. Pre-drivers 542B, 542C produce +12 volt square waves substantially synchronous with their respective inputs.

The unity-gain invertor is preferably implemented as an LM 318 configured for unity gain but opposite polarity. Square wave generators 531, 532 are readily implemented by those skilled in the art. Finally, pre-drivers 542A, 542B, 542C, and 542D are constructed in accordance with FIG. 4B.

The outputs of pre-drivers 542A and 542D drive gates of respective MOSFETs 23, 24. MOSFETs 23, 24 comprise the elements of a DC to 60 Hz half-wave convertor 549. The node between MOSFETs 23 and 24 is the same as node 402 (FIGS. 1 and 2) which is at the negative side of DC load 100 (illustrated in phantom in FIG. 5C).

MOSFETs 17 and 18, with diodes 17A, 17B, 18A, and 18B collectively comprise a half-wave to full wave converter.

The outputs of pre-drivers 542B and 542C drive gates of respective MOSFETs 17 and 18. The source of MOSFET 17 is connected to the source of MOSFET 24 via series-connected diodes 17A and 18B. The node between diodes 17A and 18B is connected to a first terminal of the AC load 100A. Similarly, the source of MOSFET 18 is connected to the drain of MOSFET 23 via series-connected diodes 18A and 17B. The node between diodes 18A and 17B is connected to a second terminal of the AC load 100A.

The drain of MOSFET 17 is connected to the drain of MOSFET 18, their common connection being the node 105 (432) which is the node at the positive terminal of the DC load 100 (shown in phantom in FIG. 5C).

MOSFETs 17, 18, 23 and 24 are preferably implemented as IRF350's. Finally, Diodes 17A, 17B, 18A, and 18B are preferably implemented as 200-volt, 30A diodes functioning as reverse polarity protectors.

In operation, the half-wave sinusoidal signals entering the gates of MOSFETs 23 and 24 are 180° out of phase with each other, thus allowing power passing from nodes 402 and 105 to pass through the AC load 100A in oppositely phased time frames. The 85 volt peak voltage half-wave sinusoids provided by each of the MOSFETs 23, 24 arranged in opposite polarities thus provides a 60 Hz full wave 120 volt RMS output to the AC load 100A.

The structure and operation of the preferred embodiment of the present invention has been described. For a more conceptual understanding, the following description is provided.

As described above, the preferred embodiment includes two tank circuits that are resonant at the same frequency. In the illustrated embodiment whose components are listed above, the resonant frequency is 20 kHz. The tank circuits have identical associated drive systems, master-time-controlled by signals A and F (FIG. 3) from gate signal generator and tank charger 114, operating at 20 kHz. Signals A and F are identical but oppositely phased positive-going, 50/50 duty cycle square waves. Each signal controls the time frame by which all other operations take place by controlling the grounding sequence between the tank circuits and their respective current source through respective grounding MOSFETs 21 and 22. Thus, alternation of functioning of the tank circuits is achieved.

Regarding operation of tank 101, at the beginning of the first major period 312, at the beginning of the first minor interval 301; at the instant that MOSFET 21 receives a positive going (0 to +12 volts) 50/50 duty cycle square wave gate voltage signal A , MOSFET 22 is receiving a neutral going (+12 volts to 0 volts) 50/50 duty cycle square wave gate voltage signal F. Tank 101 is thus connected to the gate signal generator and tank charger 114 and capacitor Cl is allowed to charge (under resonant conditions) where the inductive reactance equals the capacitive reactance to V+voltage, which in the preferred embodiment is 120 volts. Page 4–134, *Electricity One-Seven*, (Harry Mileaf, the totality of which is incorporated herein by reference) includes an explanation of parallel resonant tank circuit charging as generally understood by those skilled in the art.

At the same time that MOSFET 21 receives its positive going square wave gate signal A, MOSFET 1 of tank 101 receives the same gate signal. This opens a current flow path within tank 101 including only resistances associated with the inductor, MOSFET switch, diodes, capacitor and conductors connecting these components in series. The series resistance includes: the resistance of multi-strand wire, which may be #12 copper wire with having 0.00102 ohms resistance/foot used as conductors connecting the various components in series; the 0.15 Ohm internal drain-to-source resistance of MOSFET 1; the internal resistances of diodes 206 and 38; negligible capacitor resistance; and 12–14 inches of copper wire, which may be #12 single strand wire which makes up the coil of tank 101's inductor L1.

The magnetic core of the inductor is preferably a ferrite toroid with associated magnetic quadrature tuning circuitry. This circuitry between the positive and negative terminals of C1 makes up the complete current charging path within tank 101, which is only about 12–18 inches in length. The extremely low value of the total internal tank circuit resistance allows the tank to be operated at a high "Q" or "quality." Adjustment of the "Q" in the preferred embodiment is accomplished by varying the inductive reactance of the inductor L1. This is preferably accomplished by increasing or decreasing a DC current through the windings around a "C" cored electro-magnet physically placed at 90 degrees (at quadrature) to the axis of the toroid inductor L1. The induced magnetic field within the "C" cored electro-magnet controller changes, or "modulates" the inductive reactance of the inductor L1. Other possible means of manual or automatic physical or electronic adjustment of the tank's inductance lie within the ability of those skilled in the art for tuning the inventive power supply, and need not be further described.

Tank 102's internal charging path circuitry, associated controlling circuitry and associated current paths are functionally, and as close as possible, physically, exact duplicates of those of tank 101.

At the beginning of the first major period, tank 102, having just completed its resonant charging sequence, is at the same instant decoupled from the exterior current source as "grounding" MOSFET 22 receives neutral going (+12 to 0 volt) square wave gate signal F so that it is turned off to a non-conducting state. Also at this same instant, a current flow path is established between the negatively charged terminal of C2, the load 100, and the positive terminal of C2, because of the 0 to +12 volt, 25/75 duty cycle signal G (applied to the gates of MOSFETs 8 and 9), and signal I (applied to the gate of MOSFET 11). MOSFETs 8 and 9 receive the 0 to +12 volt, 25/75 duty cycle gate G signal which turns them on.

MOSFET 11 receives a 0 to +12 volt, 25/75 duty cycle "exponential" gate signal that is specifically designed to utilize the full 25% time period of minor interval 301 in reaching its maximum +12 volt level. It is sequenced to start at the same instant as the gate signal going to MOSFET 8. In the illustrated embodiment, all trailing, or neutral going +12 to 0 volt edges of the exponential signals are vertical; they do not ramp downward nor do they extend below the zero line.

At the end of this first minor interval, the voltages at the gates of MOSFETs 8, 9, and 11 are forced instantaneously to zero volts. This minor interval comprises only half the overall 50 percent duty cycle as determined by the gate signal generator and tank charger 114's 20 kHz rate (signals A and F).

At the instant that MOSFETs 8, 9 and 11 are turned off, MOSFETs 10 and 12 are turned on by receiving 0 to +12 volt 25/75 duty cycle gate voltage signals H and J respectively. MOSFET 10 receives a 0 to +12 volt, 25/75 duty cycle gate voltage like that sent to the gates of MOSFETs 8 and 9. MOSFET 12 receives a 0 to +12 volt, 25/75 duty cycle "exponential" gate voltage signal identical to that sent earlier to the gate of MOSFET 11.

This second set of MOSFET controls the discharging path during the second minor interval 302 (and therefore, the timing of th collapse of the magnetic field of L2) which was created by the discharge of capacitor C2. This second minor interval 302 (occupying the second 50 percent of the first major period time frame) takes up the remaining portion of the discharge time frame. This discharge time frame is the first major period allotted to tank 102 by the 20 kHz signals A and F from the gate signal generator and tank charger 114.

This is the preferred configuration of MOSFETs 8–12 in the discharge current path of tank 102, and the preferred configuration of MOSFETs 21 and 1 in the current capacitor charge path of tank 101. As stated above, MOSFETs 1–4, 7–10, and 21–22 act as "on/off" switches, thus changing the various current flow paths, while other MOSFETs (5, 6, 11, and 12) act as constant current controllers. MOSFET 11 controls the current discharge flow rate of tank 102's capacitor C2, while MOSFET 12 controls the current flow rate created by the controlled collapse of the magnetic field of tank 102's inductor L2. By design, the tank capacitors are not in the current flow discharge path of the tank inductors. When a tank inductor discharges within in the second minor interval, it does not change polarity as in standard tank circuits. Nor do the tank capacitors change in polarity as in standard tank circuits; they charge in one direction only. This action is totally different than that of standard tank circuit.

The advantages of the present invention are many, but include:

1) Each resonant tank is directed to charge its capacitor independent of any exterior load being connected to it, thereby realizing the resonance charging conditions to the fullest.

2) Each tank element is discharged through the load in a uniform manner with a common and unchanging polarity to the load (for DC operation).

A discussion is presented here to amplify the advantages summarized in the previous paragraphs; for it is here that the present invention demonstrates some of its advances in the art.

By first controlling the current flow discharge rate of the resonant tank capacitor, and then controlling the discharge rate of the resonant tank inductor, the following occurs. First, a non-resonant RC circuit, and then a non-resonant LR circuit, powers the load. Powering a load using non-resonant circuits is standard practice today in some power supplies, but any powering circuits are used independently of each other. In contrast, the present embodiment sequentially uses a non-resonant RC circuit and a non-resonant LR circuit. Also, and more important, by discharging the elements of both resonant tank circuits in exactly half the time that was allotted for resonant charging of the individual tank capacitors, twice the available current (and thus, correspondingly increased power) is made available to the load in comparison to the situation in which each capacitor is discharged at its resonant charging rate. In fact, discharging each capacitor at its resonant charging rate would bring about very disastrous conditions for most loads. This is because series resonant conditions would come into play with its associated condition of reactive voltage increases which would be impressed across the load.

By utilizing the MOSFETs 5, 6, 11, and 12 as variable resistors (functioning as constant current controllers) and decreasing their resistance exponentially from maximum to minimum during the "on" portion of the appropriate minor interval, the following is accomplished: By decreasing the internal resistance to current flow within each tank capacitor's discharge circuit over the full minor interval in a manner that exactly counteracts and yet controls the decreasing voltage of the discharging tank capacitor, the load is presented with controlled, even current. Thus, the load can react evenly, as if fed by a constant voltage, constant current source. Similarly, by decreasing the internal resistance within each tank inductor's discharge circuit over the entire minor interval in a manner that exactly counteracts and yet controls the decreasing voltage associated with the collapsing magnetic field, the load is again presented with controlled current.

This advantage is accomplished by exactly matching the previous negative polarity to positive polarity supplied by the tank capacitor (only now from the tank inductor) during the entire time frame in which inductor magnetic field collapse is experienced. The different voltage potentials (+120V and neutral, or ground) required by the load to operate properly is first supplied by the tank 102 capacitor C2 during minor interval 301, then by tank 102 inductor L2 during minor interval 302, then by tank 101 capacitor C1 during minor interval 303, and finally by tank 101 inductor L1 during minor interval 304; at which time minor interval 301 begins again and the entire sequence repeats. Again, it is as if a non-changing, constant voltage source is being applied to the load.

Each of the discharge time "minor intervals" is exactly one-half the full tank charge time "major periods". This fulfills the requirement of balancing the charge/discharge ratio to obtain equilibrium within the circuit As described above, as the tank 102 components C2 and L2 are discharging through the load in a non-resonant manner, tank 101 is charging the capacitor C1 (which is not connected to the load) under parallel resonant conditions. The individual series-connected discharge time rates are one-half the charge time rate, so that the discharge current flow rate is twice as fast, thus affording the load twice the available current compared with a set of operating conditions where each discharge time rate is equal in time to each charge time rate. After the elements of tank 102 have discharged through the load, encountering only series resistive losses due to the conductive paths, the inductor coil, tank diodes, and the load, they are disconnected from the load by MOSFETs 8, 9, 10, 11, and 12 as they receive neutral going +12 to 0 volt signals G, G, H, I, and J, respectively at their gates. At the same instant, the proper positive going gate voltages are applied to the appropriate tank 101 MOSFETs (tank 101 having just completed resonant charging of its capacitor C1), and the cycle of powering the load during the second major period 334 during minor intervals 303, 304, (from the elements of tank 101) can begin.

In summary, the described embodiment has the following features:

The ability to use reactive power to completely power a load through the process of controlled current flow from alternately employed series non-resonant LR and RC circuits of which the L and C components, during the charging cycle, form a parallel resonant tank circuit.

The ability to utilize the natural magnification characteristics of a resonant tank circuit to bring about the full charge condition of a capacitor through a circuit path other than only through the current's voltage source (as in a series resonant circuit).

The ability to double the effective available current to a load. This is accomplished by halving the available discharge time per element, from the capacitor and then from the inductor of each tank.

The ability to continuously power a pseudo-series-connected load by using two identical resonant tank circuits. One tank circuit's capacitor under resonant conditions is charged from an external voltage source while being isolated from the load. The other previously charged tank circuit's elements discharge (under controlled series circuit conditions as described above) through the load while being isolated from the external voltage source.

The ability to continuously power a load with an electronic power supply that cannot suffer from the problem of voltage drop (a dropping or decreasing voltage potential experienced by known generators).

The ability to continuously power a load with an electrical power source. The external voltage/current source (battery 118) supplies the necessary voltage and current to fulfill the power requirements to charge up C1 in tank 101 during the first major period. After the resonant charging of one of the two resonant tanks, the charged tank elements start to discharge through the load.

As can be seen from the above description of circuit operations, the circuitry operates in both "best mode" cases of resonance. First, regarding series resonance, the illustrated embodiment has the ability to deliver maximum available power to a load. Second, regarding parallel resonance, the illustrated embodiment has the ability to charge a capacitor to act as a voltage potential source utilizing the absolute minimum amount of current from an external current source.

Additional circuitry may be added to the illustrated embodiment to utilize the ability of a DC "power" source to be non-discriminatory in its own power requirements under the condition known as DC superposition. In this scenario, the resonant tank circuitry takes its required current and voltage from whatever source such as battery 118 and/or feedback controller 110, or a combination of both, as long as each has the correct voltage polarity and minimum required current. The system may be specifically designed to utilize feedback controller 110 for the primary (internal) DC voltage and current source, and may use battery 118 as an external DC voltage and current source for the secondary DC source.

The system exhibits maximum impedance to current flow from the point of view of looking out from the resonant tank circuit toward its voltage and current source, as any resonant tank circuit should. At the same time, it powers the load as a series circuit would, with impedance to current flow coming only from line resistance (determined by the size and other properties of the wire used in the discharge path). The system is not under series resonant conditions in the discharge mode because the discharge frequency is twice that of the charge frequency: 40 kHz versus the 20 kHz resonant frequency of the system.

The dual, yet independent series LR and RC discharge circuits making up tanks 101 and 102 have the ability to fulfill all electrical power requirements: each can supply the necessary voltage and current to each other as the internal system "power source", (feedback controller 110, gate signal generator and tank charger 114, gate signal amplifier 116, and associated circuitry) that is charging the other tank circuit (which is charging under resonant conditions at 20 kHz) as a load in parallel to load 100. The reason for this condition is that the particular section of the system being charged under resonant conditions is connected (from a load-power-requirements point of view) to the other part of the power supply that is powering load 100 at that instant. Only those resonant tank circuit components that had been previously charged up under resonant conditions, and were previously disconnected from the "internal" power source (the other tank circuit but not feedback controller 110) during this time frame is powering the total parallel load. In this usage of the term "load", the "internal" tank circuit control circuitry and the other charging tank circuit are a part of the total "load", not just load 100.

Under conditions of resonance, "tunnel diodes", or "Esaki diodes", can be used in the resonant tank circuit, and all necessary outside current directly fed to the tank circuit itself can be eliminated. The reason is that a tunnel diode creates a condition known as "negative resistance". The effect it can have upon the tank circuit in which it is placed is to reduce the effective pure resistance to an absolute minimum. Therefore, with an effective internal pure resistance at an absolute minimum within the tank itself as described above, an absolute minimum "line current" running through node 106 is necessary.

As shown in FIG. 2, two circuits are operating at the same time. In the first minor interval 301 (FIG. 3), tank 101 is being charged, and is disconnected from load 100 and feedback controller 110 as MOSFETs 2, 3, 4, 5, and 6 are not conducting. Tank 101 is connected to the internal power source (feedback controller 110; gate signal generator and tank charger 114; and gate signal amplifier 116) through its diode on the positive 120V node 202 through node 106. MOSFET 21 provides the connection to the ground side.

Tank 102's capacitor and then its inductor discharge through the "load" (which, for these purposes, is considered to include tank 101, the internal power source (feedback controller 110, gate signal generator and tank charger 114, gate signal amplifier 116, and parallel load 100)). At this time, tank 102 is disconnected from the internal power supply (feedback controller 110, gate signal generator and tank charger 114, gate signal amplifier 116) because diode 216 at the positive terminal of capacitor C2 does not allow the capacitor to discharge directly to it. MOSFET 22, positioned between tank 102 and the internal power source ground, has also been turned off, thus isolating tank 102 discharge circuitry from the internal and external power source grounds.

In this manner, each discharging tank circuit component forms both its own ground source and current source to load 100 and its parallel load made up of feedback controller 110, gate signal generator and tank charger 114, gate signal amplifier 116, and the other tank circuit. MOSFETs 11 and 12, each receiving a exponential gate signal, control the amount of current allowed to be delivered to the loads as described earlier for the following reason.

Current should be delivered in a steady, even manner to obtain the desired effect of powering the load evenly. An evenly applied amount of current supplied to a steady and unchanging load will allow the proper, even, designed voltage drop to be developed across the load. The availability of current flow (up to a predetermined maximum amount as determined by the dual tank circuit components and discharge circuitry) applied to a changing load; either resistive, inductive, capacitive, or a combination thereof, can power that load as supplied by the system. Because "current flow" (and not voltage) is the "common denominator" in all four load conditions listed above, the various different voltage drops; and their individual phase relationships at the individual loads can be developed by the various loads as required. The present system utilizes the ability of a power MOSFET to be used as a variable resistor in controlling the current flow rate. The present system controls the current flow rate supplied to the load by decreasing its resistance to current flow in a manner that is an exact correlation to the dropping source voltage being supplied first by tank capacitors and then tank inductors. This arrangement delivers the correct flow of current needed to pass through and as required by the load. As the voltage of, first, the tank capacitor and then the tank inductor, drops, the controlling MOSFETs' internal resistance also must drop.

During the first minor interval 301 (FIG. 3) the discharging of the tank 102 capacitor C2 supplies the necessary difference of potential between its terminals to cause current flow through the parallel loads, as controlled by MOSFET 11.

During the second minor interval 302 (FIG. 3) the collapsing magnetic field of the tank 102 inductor L2 supplies the necessary difference in potential between its poles to cause current flow through the load, as controlled by MOSFET 12.

During minor intervals 303 and 304 (FIG. 3), the above described current flow occurs again. Tank 101 powers the "load" (which now includes both tank 102 and the internal power source as described previously). Tank 101 capacitor Cl is disconnected from gate signal generator and tank charger 114 through node 106 by diode 206 at C1's positive terminal, thus not allowing Cl to discharge back into itself, MOSFET 15 being turned off, and by the non-conducting ground controlling MOSFET 21 being turned off. MOSFET controls the discharge time of capacitor Cl, in the same manner as MOSFET 11 controls the discharge time of capacitor C2. MOSFET 6 controls the decay time of the magnetic field of inductor L1, in the same manner as MOSFET 12 controls the decay time of the magnetic field of inductor L2. MOSFETs 8, 9, and 10 are turned off to allow tank 102 to charge capacitor C2 to the applied 120 volts supplied from the gate signal generator and tank charger 114.

Modifications and variations of the above-described embodiments of the present invention are possible, as appreciated by those skilled in the art in light of the above descriptions. It is therefore to be understood that, within the scope of the appended claims and their equivalents, the invention may be practiced otherwise than as specifically described.

What is claimed is:

1. A power supply for supplying power to a load, the power supply comprising:
   a) a first tank circuit having a resonant frequency; and
   b) a second tank circuit having a resonant frequency substantially identical to the resonant frequency of the first tank circuit;
   wherein the two tank circuits are constructed and adapted to function repetitively in two major periods,
      A) in the first major period, the first tank is disconnected from powering the load and the second tank supplies power to the load and charges the first tank; and
      B) in the second major period, the second tank is disconnected from powering the load, and the first tank supplies power to the load and charges the second tank.

2. The power supply of claim 1, further comprising:
   c) a plurality of switches for selectively interconnecting the tank circuits and the load; and
   d) a gate signal generator for generating gate signals for controlling the switches.

3. The power supply of claim 2, further comprising:
   e) a gate signal amplifier, receiving the gate signals from the gate signal generator, for producing amplified gate signals which are connected to the switches.

4. The power supply of claim 2, further comprising:
   f) a tank charger for providing power to the first and second tank circuits;
   g) a battery for selectively providing power to the gate signal generator and tank charger; and
   h) a feedback controller, connected between the load and the tank charger, for selectively providing additional power from the tank circuits to the gate signal generator and tank charger.

5. The power supply of claim 4, further comprising:
   at least one regulator circuit, responsive to either the battery or the feedback controller, for producing regulated voltage used by the gate signal generator and the tank charger.

6. The power supply of claim 4, wherein:
   the tank charger includes:
      1) a step down circuit for converting a regulated voltage from the at least one regulator circuit to a voltage smaller than the regulated voltage; and
      2) a step up circuit, responsive to an output of the step down circuit, for producing a tank drive voltage which is larger than the regulated voltage;
      wherein the first tank circuit and the second tank circuit are responsive to the tank drive voltage.

7. The power supply of claim 2, wherein the gate signal generator includes:
   a circuit for producing a plurality of minor interval signals, only one of which is active at the same time, the one of the minor interval signals which is active scans successively and repetitively among the plurality of minor interval signals, the scanning being completed in a period of time substantially equal to the two major periods.

8. The power supply of claim 7, wherein the circuit for producing the plurality of minor interval signals includes:
   a demultiplexer having first, second, third, and fourth minor interval outputs, wherein:
      1) the first and second outputs being successively active during respective first and second minor intervals in the first major period; and
      2) the third and fourth outputs being successively active during respective third and fourth minor intervals in the second major period.

9. The power supply of claim 2, wherein the gate signal generator includes:
   a circuit for producing first and second major period signals, wherein:
      1) the first major period signal being active during the first major period and inactive during the second major period; and
      2) the second major period signal being active during the second major period and inactive during the first major period.

10. The power supply of claim 1, further comprising a timing circuit for an AC load, the timing circuit for the AC load including:
    a sinusoidal generator for generating a first sinusoidal signal of a first magnitude;
    a first circuit for converting the first sinusoidal signal into two oppositely phased sinusoidal half-waves;
    a second circuit for converting the first sinusoidal signal into two oppositely phased square waves; and
    a conversion circuit, responsive to the first circuit and second circuit, that, under control of the square waves, combines the two sinusoidal half-waves into a full wave sinusoid of a second magnitude, the full wave sinusoid being applied to the AC load.

11. The power supply of claim 1, wherein:
    each of the first tank circuit and the second tank circuit includes:
      1) a first node and a second node;
      2) a first pathway between the first node and the second node including a series-connected inductor, a first intermediate node, and first switch;
      3) a second pathway between the first node and the second node including a capacitor; and
      4) a third pathway, connected between the first intermediate node in the first pathway and the second node, the third pathway including a second switch;
    wherein the first and second switches govern current flow within and through the first and second tank circuits.

12. The power supply of claim 11, wherein:
    each of the first tank circuit and the second tank circuit further has associated with it:
      5) a fourth pathway connecting the first intermediate node with a first terminal of the load via a third switch; and
      6) a fifth pathway connecting the first node to the first terminal of the load via a fourth switch.

13. The power supply of claim 11, wherein:
    each of the first tank circuit and the second tank circuit has associated with it:
      7) a constant current controller connected between a second terminal of the load and the first node.

14. The power supply of claim 13, wherein the constant current controller includes:

two MOSFETs which operate in linear regions so as to control current which enters the first node.

15. A power supply for supplying power to a load, the power supply comprising:
a) a first tank circuit having a resonant frequency, the first tank circuit comprising a first capacitor and a first inductor which substantially determine the resonant frequency of the first tank circuit;
b) a second tank circuit having a resonant frequency substantially identical to the resonant frequency of the first tank circuit, the second tank circuit comprising a second capacitor and a second inductor, which substantially determine the resonant frequency of the second tank circuit;
c) a plurality of constant current controllers for connecting the tank circuits to the load; and
d) a set of switches for selectively interconnecting the tank circuits, constant current controllers and load; wherein the tank circuits, constant current controllers and switches ar constructed and arranged to function in first and second major periods, each of the first and second major periods comprising first and second minor intervals, wherein:
1) the first minor interval of the first major period defines an interval during which the second capacitor is providing power to the load and is charging the first tank circuit;
2) the second minor interval of the first major period defines an interval during which the second inductor is charging the first tank circuit and providing power to the load;
3) the first minor interval of the second major period defines an interval during which the first capacitor charges the second tank and provides power to the load; and
4) the second minor interval of the second major period defines an interval during which the first inductor charges the second tank and provides power to the load;

wherein the switches control the timing of the minor intervals and major periods.

* * * * *